(12) United States Patent
Kasahara et al.

(10) Patent No.: US 8,975,322 B2
(45) Date of Patent: Mar. 10, 2015

(54) CALCIUM CARBONATE FILLER FOR RESIN, PROCESS FOR PRODUCING THE SAME, AND RESIN COMPOSITION CONTAINING THE FILLER

(75) Inventors: Hidemitsu Kasahara, Hyogo (JP); Kouhei Sako, Hyogo (JP); Tomonori Kosaka, Hyogo (JP); Homare Kudo, Hyogo (JP); Shigeo Takiyama, Hyogo (JP); Hisakazu Kojo, Hyogo (JP)

(73) Assignee: Maruo Calcium Co., Ltd., Akashi-shi (JP)

( * ) Notice: Subject to any disclaimer, the term of this patent is extended or adjusted under 35 U.S.C. 154(b) by 0 days.

(21) Appl. No.: 14/110,267

(22) PCT Filed: Apr. 12, 2012

(86) PCT No.: PCT/JP2012/059985
§ 371 (c)(1),
(2), (4) Date: Oct. 7, 2013

(87) PCT Pub. No.: WO2012/141236
PCT Pub. Date: Oct. 18, 2012

(65) Prior Publication Data
US 2014/0024761 A1    Jan. 23, 2014

(30) Foreign Application Priority Data
Apr. 13, 2011    (JP) .................................. 2011-088999

(51) Int. Cl.
*C08K 3/26*    (2006.01)
(52) U.S. Cl.
CPC .............. *C08K 3/26* (2013.01); *C08K 2003/265* (2013.01)
USPC .......................................... 524/425; 423/430
(58) Field of Classification Search
CPC ........................... C08K 3/26; C08K 2003/265
USPC .......................................... 524/425; 423/430
See application file for complete search history.

(56) References Cited

U.S. PATENT DOCUMENTS

| | | |
|---|---|---|
| 5,275,651 A | 1/1994 | Minayoshi et al. |
| 5,494,651 A | 2/1996 | Minayoshi et al. |
| 2010/0048791 A1* | 2/2010 | Vucak et al. .................. 524/425 |

FOREIGN PATENT DOCUMENTS

| | | |
|---|---|---|
| JP | 57-182338 | 11/1982 |
| JP | 62-207337 | 9/1987 |
| JP | 05-294616 | 11/1993 |
| JP | 7-509684 | 10/1995 |
| JP | 04-292414 | 9/1999 |
| JP | 2003-040618 | 2/2003 |
| JP | 2005-125700 | 5/2005 |
| WO | 93/20010 | 10/1993 |

* cited by examiner

*Primary Examiner* — Peter Szekely
(74) *Attorney, Agent, or Firm* — Kratz, Quintos & Hanson, LLP

(57) ABSTRACT

A calcium carbonate filler for a resin, in which the content rate of particles having a particle diameter of 0.26 μm or less is 30% or less in a number particle size distribution diameter measured (Mac-VIEW manufactured by Mountech) from an electron micrograph, and which satisfies the following expressions (a) to (c) is provided.

$Dms5/Dmv5 \leq 3$    (a)

$1 \leq Sw \leq 8 \ (m^2/g)$    (b)

$Mo \leq 300 \ (ppm)$    (c)

wherein

Dms5: A 5% diameter (μm) accumulated from a small particle side in a volume particle size distribution by a laser diffraction particle size distribution measuring device (MASTERSIZER2000 manufactured by Malvern); Dmv5: A 5% diameter (μm) accumulated from a small particle side in a number particle size distribution in a particle diameter (Mac-VIEW manufactured by Mountech) measured with an electron microscope; Sw: A BET specific surface area (Macsorb manufactured by Mountech) ($m^2/g$); Mo: A water amount (ppm) by the Karl Fischer method at 200 to 300° C.

The calcium carbonate filler for a resin of the present invention contains less fine powders, has a particle size which has been adjusted to a specific particle size, and contains less volatile components such as water etc. and, even when it is incorporated into a resin having a high processing temperature at a high concentration, problems such as foaming etc. are solved.

9 Claims, 1 Drawing Sheet

CALCIUM CARBONATE FILLER FOR RESIN, PROCESS FOR PRODUCING THE SAME, AND RESIN COMPOSITION CONTAINING THE FILLER

TECHNICAL FIELD

The present invention relates to a calcium carbonate filler for a resin, a process for producing the same, and a resin composition containing the filler, more particularly, to a calcium carbonate filler for a resin, which is a uniform particle containing less fine powders, and contains less volatile components such as water etc., a process for a producing the same, and a resin composition in which the filler is incorporated.

Generation of volatile components such as water etc. by the calcium carbonate filler for a resin of the present invention is small in quantity in a specific temperature range. Thus, when it is incorporated into, for example, a resin such as a polyester resin and an engineering resin having a high processing temperature as well as the conventional sealant, flooring material and adhesive in which the filler is incorporated at a high concentration, a resin composition excellent in thermal stability can be obtained.

Further, since the calcium carbonate filler for a resin of the present invention contains less fine powders and coarse particles, and is excellent in uniformity and dispersibility of particles, it is useful, particularly, as a micropore forming agent for white PET used in a light reflection plate for a liquid crystal of a cellular phone, a notebook computer, a television, etc.

BACKGROUND ART

Previously, calcium carbonate has been incorporated at a high concentration in the utility of a plastisol in which a vinyl chloride resin or an acrylic resin and a plasticizer are mixed, and the sealant field in which a urethane resin or a silicone resin, a polysulfide resin etc. are mixed. On the other hand, among synthetic resins, for example, in the field having a high processing temperature such as a polyester resin, a representative of which is polyethylene terephthalate (PET), an engineering plastic, a representative of which is polyamide (PA), polycarbonate (PC), or polyphenylene sulfide (PPS), calcium carbonate has previously been incorporated at a very small amount for the purpose of a light diffusing material, an anti-blocking material etc.

For example, a porous white PET film, produced by a method of forming porous voids at an interface between a PET resin and a micropore forming agent by a method of adding calcium carbonate whose particle size has been adjusted as a micropore forming material together with a non-compatible resin to a PET resin, and stretching this into a film (sheet) (Patent Reference 1), or a method of adding an inorganic fine particle such as barium sulfate etc. to a PET resin, and stretching this into a film (sheet) (Patent Reference 2) has been practicalized in a wide variety of fields such as a synthetic paper, a (prepaid) card, a label, an optical reflecting film (sheet) etc. Among them, for example, in the case of a light reflecting film utilized in the utility of liquid crystal TV, high image quality, wide screen, and low cost of liquid crystal TV are required.

CITATION LIST

Patent Literatures

Patent Literature 1: JP 62-207337 A
Patent Literature 2: JP-2005-125700 A

SUMMARY OF INVENTION

Technical Problem

When calcium carbonate is compared with other micropore forming agent such as an organic non-compatible resin, barium sulfate, titanium oxide, etc., since calcium carbonate is not only more inexpensive, but also has higher heat resistance as compared with the organic non-compatible resin, there is also a merit in that an edge portion (selvage portion) which is generated at manufacturing of a white PET film can be recycled, and is also advantageous in respect of the environment and a yield.

And, barium sulfate and titanium oxide have a specific gravity of about 4 to 4.5 $g/cm^3$, while a specific gravity of calcium carbonate is low such as about 2.7 $g/cm^3$, and thus, an addition weight can be decreased to about ⅔, and this is advantageous in respect of the cost and weight saving. Therefore, a white porous resin film with calcium carbonate incorporated therein is required by the market.

However, when calcium carbonate is incorporated into a white PET resin at a high concentration, particularly, there are problems that a volatile component such as water etc. present in a surface of a calcium carbonate fine particle makes a white porous resin film foam, and that a calcium carbonate fine particle causes reduction in optical performance. Thus, incorporation of calcium carbonate at a high concentration has previously been a problem to be solved.

In view of the aforementioned circumstances, an object of the present invention is to provide a calcium carbonate filler containing less fine particles, in which a volatile component such as water etc. present in a surface of calcium carbonate is controlled to a specific range or lower, in order to allow for incorporation in a resin having a high processing temperature at a high concentration and, further, to provide a resin composition which is excellent in thermal stability even when it is incorporated into a resin having a high processing temperature at a high concentration.

Solution to Problem

The present inventors intensively studied in order to solve the aforementioned problems and, as a result, found that a calcium carbonate filler, in which a volatile component such as water etc. present in a surface of calcium carbonate which contains less fine powders and has been adjusted to a specific particle size, is decreased to a specific amount or lower in a specific temperature range can suppress foamability etc., even when it is incorporated into a resin having a high processing temperate at a high concentration, resulting in completion of the present invention.

That is, the feature of the present invention is a calcium carbonate filler for a resin, in which a content rate of particles having a particle diameter of 0.26 μm or less is 30% or less in a number particle size distribution diameter measured (MacVIEW manufactured by Mountech) from an electron micrograph, and which satisfies the following expressions (a) to (c).

$$Dms5/Dmv5 \leq 3 \quad (a)$$

$$1 \leq Sw \leq 8 \ (m^2/g) \quad (b)$$

$$Mo \leq 300 \ (ppm) \quad (c)$$

wherein
Dms5: A 5% diameter (μm) accumulated from a small particle side in a volume particle size distribution by a laser diffraction particle size distribution measuring device (MASTERSIZER2000 manufactured by Malvern);

Dmv5: A 5% diameter (μm) accumulated from a small particle side in a number particle size distribution in a particle diameter (Mac-VIEW manufactured by Mountech) measured with an electron microscope;

Sw: A BET specific surface area (Macsorb manufactured by Mountech) (m$^2$/g);

Mo: A water amount (ppm) by the Karl Fischer method at 200 to 300° C.

Another feature of the present invention is the calcium carbonate filler for a resin, in which a generated gas amount of M/Z44 satisfies the following expression (d).

$$Co \leq 300 \text{ (ppm)} \qquad (d)$$

wherein

Co: A generated amount (ppm) of M/Z44 in a range of 100 to 200° C., according to a differential thermobalance and mass spectrometry simultaneous measuring device (TG-DTA-MS manufactured by Rigaku Co., Ltd., trade name: Thermo Mass photo).

Still another feature of the present invention is the calcium carbonate filler for a resin, in which the content rate (%) of particles having a particle diameter of 5 μm or more satisfies the following expression (e), in a number particle size distribution in a projected area diameter by a flow particle image analyzer (FPIA (registered trademark)-3000 manufactured by Malvern).

$$Fp \leq 2(\%) \qquad (e)$$

Still another feature of the present invention is the calcium carbonate filler for a resin, a surface of which has been treated with at least one selected from a polycarboxylic acid surface treating agent and an organophosphorus surface treating agent.

Still another feature of the present invention is a process for producing a calcium carbonate filler for a resin, which comprises heat-treating calcium carbonate at a product temperature of 200 to 550° C. using a heating device selected from a kiln, an incubator and a microwave furnace.

Still another feature of the present invention is a resin composition comprising a resin and the calcium carbonate filler for a resin.

Still another feature of the present invention is the resin composition, wherein the resin is a polyester resin.

Still another feature of the present invention is the resin composition, wherein the polyester resin is polyethylene terephthalate (PET) for light reflection.

Still another feature of the present invention is the resin composition, wherein the resin is a polyphenylene sulfide resin.

Advantageous Effects of Invention

Since the calcium carbonate filler for a resin of the present invention contains less fine powders, has a particle size which has been adjusted to a specific particle size, and contains less volatile components such as water etc., even when it is incorporated into a resin having a high processing temperature at a high concentration, it does not cause a problem such as foaming etc. at molding. Particularly, the calcium carbonate for a resin of the present invention is useful in the field such as a light reflection plate for a liquid crystal requiring reflectivity and light resistance, and a lamp reflector requiring an adhering force between a metal film and glossiness etc.

DESCRIPTION OF EMBODIMENTS

Figure 1:
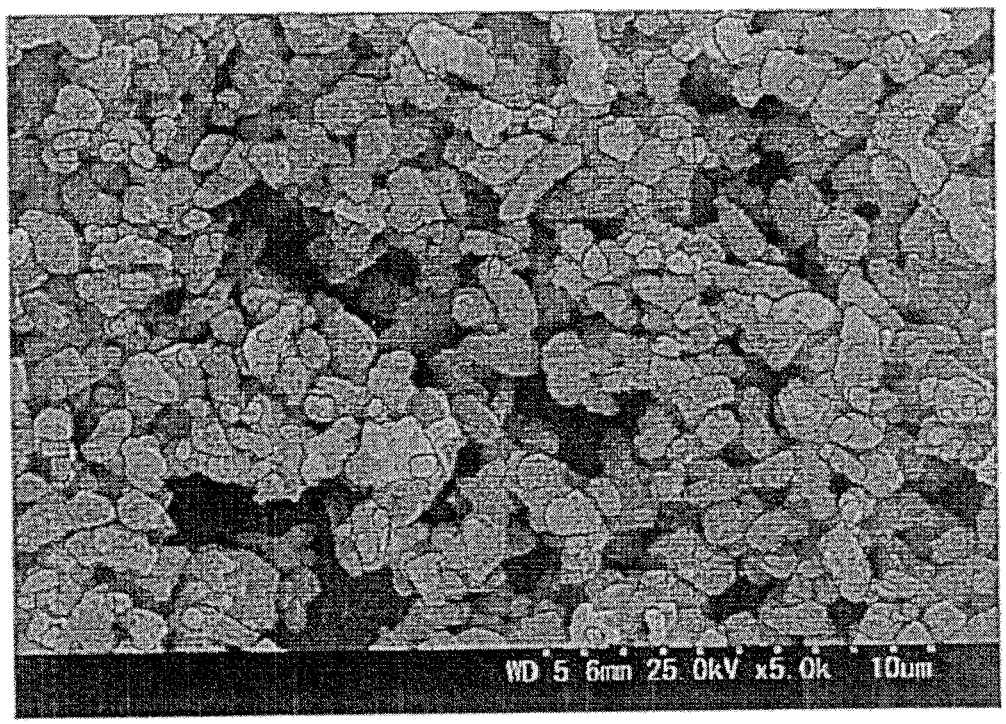
FIG. 1 shows a photograph of an electron microscope SEM diameter of a calcium carbonate filler for a resin obtained in Example 2.

In the calcium carbonate filler for a resin of the present invention (hereinafter, referred to as calcium carbonate filler), it is necessary that the content rate of particles having a particle diameter of 0.26 μm or less is 30% or less, in a number particle size distribution diameter measured (Mac-VIEW manufactured by Mountech) from an electron micrograph, and the following expressions (a) to (c) are satisfied.

$$Dms5/Dmv5 \leq 3 \qquad (a)$$

$$1 \leq Sw \leq 8 \text{ (m}^2\text{/g)} \qquad (b)$$

$$Mo \leq 300 \text{ (ppm)} \qquad (c)$$

wherein

Dms5: A 5% diameter (μm) accumulated from a small particle side in a volume particle size distribution by a laser diffraction particle size distribution measuring device (MASTERSIZER2000 manufactured by Malvern);

Dmv5: A 5% diameter (μm) accumulated from a small particle side in a number particle size distribution in a particle diameter measured with an electron microscope (Mac-VIEW manufactured by Mountech);

Sw: A BET specific surface area (Macsorb manufactured by Mountech) (m$^2$/g);

Mo: A water amount (ppm) by the Karl Fischer method at 200 to 300° C.

Generally, the smaller the particle diameter, the stronger the interparticle aggregability due to an intermolecular force or a liquid bridge force derived from water. When one tries to measure a particle diameter of a fine primary particle, it is extremely difficult to measure fine primary particles one by one, with a general particle size distribution measuring device of a laser diffraction method etc., and a diameter of a fine primary particle tends to be determined as a diameter of a big mass of particle body which is a secondary aggregated body or a tertiary aggregated body formed by aggregation of primary particles. Even when particles are preliminarily dispersed with an ultrasonic dispersing machine, it is extremely difficult for primary particles to be completely loosened and dispersed. Therefore, the aforementioned general particle size distribution measuring device is unsuitable for precisely measuring a fine primary particle diameter of 0.26 μm or less.

Therefore, a method of measuring a fine primary particle diameter in the present invention requires that, based on a number particle size distribution measured from an electron micrograph by observing particles one by one visually, the content rate of fine primary particles having a particle diameter of 0.26 μm or less is 30% or less, in a particle size distribution thereof. When the content rate of the particles exceeds 30%, degassing of water etc. present in a surface of a calcium carbonate particle is not only difficult, but also a particle easily adsorbs a moisture from the outside air, and thus, aggregation between calcium carbonate particles is strong, and the particle cannot be used in the object and the utility of the present invention. Therefore, the content rate of the particles is more preferably 25% or less, further preferably 20% or less. In addition, a lower limit is not particularly limited, but it is preferably as low as possible, and 0% is most desirable.

A method of measuring an electron micrograph diameter using Mac-VIEW manufactured by Mountech is as follows.

<Measurement Method>

A 3 g of calcium carbonate filler and 60 g of a methanol solvent are added and suspended in a beaker (100 ml), and preliminarily dispersed under the constant condition of 300 μA-one minute, using a chip type ultrasonic dispersing machine (US-300T; manufactured by NIHONSEIKI KAISHA LTD.). Then, the dispersion is thinly and uniformly placed on a SEM sample stage using a 0.5 ml spuit, and is dried to prepare a sample.

After the prepared sample is observed with SEM at such magnification that 100 to 500 pieces can be counted, contours of 100 to 500 particles are traced and counted in an order from an edge, using a commercially available image analysis type particle size distribution measuring software (Mac-VIEW manufactured by Mountech), to obtain the Heywood diameter (projected area diameter). In addition, a particle size distribution is a number frequency, and 30% or less is number % per 100 to 500.

Examples of an electron microscope-observed image are not particularly limited, but include a SEM (scanning electron microscope) image, a TEM (transmission electron microscope) image, and an electric field emission image thereof, and the SEM image was used in the present invention.

Concerning the (a) expression of the present invention, it is necessary that a value obtained by dividing a 5% diameter accumulated from a small particle side in a volume particle size distribution obtained from a laser diffraction particle size distribution measuring device (MASTERSIZER2000 manufactured by Malvern) (Dms5) (hereinafter, referred to as laser diffraction diameter in some cases) by a 5% diameter accumulated from a small particle side in a number particle size distribution obtained from electron microscope observation (Dmv5) (hereinafter, referred to as electron microscope diameter in some cases) is 3 or less.

As described above, the finer the primary particle, the more particle retains water, and an aggregation adhering force becomes firmer. Therefore, in the case of a commercially available laser diffraction type, since an aggregation-adhered secondary aggregate or tertiary aggregate is counted as one particle, a diameter of primary particles observed from an electron microscope-observed image is precisely counted and measured one by one and, regarding a laser diffraction diameter and an electron microscope diameter, a ratio of respective 5% diameters accumulated from a small particle side is adopted.

When the (a) expression exceeds 3, that is, when a difference between the laser diffraction diameter and the electron microscope diameter is great, this results in that the content rate of fine particles is large, and this filler cannot be used in the utility aimed at by the present invention. Therefore, the (a) expression is preferably 2.7 or less, further preferably 2.5 or less. In addition, a lower limit is preferably near 1.0, and 1.0 is most desirable.

A measurement method with a laser diffraction particle size distribution measuring device (MASTERSIZER2000 manufactured by Malvern) is as follows.
<Measurement Method>

A laser diffraction particle size distribution measuring device (MASTERSIZER2000 manufactured by Malvern) is used, and as a medium, methanol is used. Before measurement, in order to make suspending of the calcium carbonate filler for a resin of the present invention constant, as pre-treatment, 0.1 g of a calcium carbonate filler and 50 ml of a methanol solvent are added and suspended in a beaker (100 ml), and the filler is preliminarily dispersed under the constant condition of 300 μA-one minute using a chip type ultrasonic dispersing machine (US-300T; manufactured by NIHONSEIKI KAISHA LTD.). Thereafter, a measured value is obtained.

The (b) expression of the present invention represents individual sizes of calcium carbonate fillers as a BET specific surface area (Sw), and it is necessary that the BET specific surface area is 1 to 8 $m^2/g$. When Sw exceeds 8 $m^2/g$, a volatile component such as water etc. contained in calcium carbonate is large in quantity, and there is a problem in reduction in water. In the case of Sw of less than 1 $m^2/g$, when incorporated into a resin, a particle of a calcium carbonate filler is great, and thus, it is difficult to mix the particle with a resin uniformly, and even when they can be mixed, there is a problem that a calcium carbonate filler is dropped from a resin molded body. Further, when used as the aforementioned micropore forming material for a light reflecting film, there is also a problem that a micropore diameter is too great. Therefore, Sw is more preferably 2 to 7 $m^2/g$, further preferably 3 to 6 $m^2/g$.

A measurement method with a BET specific surface area measuring device (Macsorb manufactured by Mountecs) is as follows.
<Measurement Method>

Into a measuring device was set 0.2 to 0.3 g of a dried calcium carbonate filler, and as pre-treatment, heat treatment at 200° C. for 10 minutes was performed under the atmosphere of a mixed gas of nitrogen and helium and, thereafter, low temperature low humidity physical adsorption was preformed under the environment of liquid nitrogen to measure a specific surface area.

The (c) expression of the present invention is an amount of water (Mo) generated when the calcium carbonate filler of the present invention is heated to 200 to 300° C., and it is necessary that Mo is 300 ppm or less. When Mo exceeds 300 ppm, since an amount of water present in a surface of calcium carbonate is too large, for example, when incorporated into a resin having a high processing temperate at a high concentration, bubbles are generated in a resin by water contained in the calcium carbonate filler. Further, when a resin is monoaxially or biaxially stretched by formation of a film, a problem arises that the bubbles generate streaks or spots, leading to greater pores. Therefore, Mo is more preferably 200 ppm or less, further preferably 150 ppm or less, particularly preferably 100 ppm or less. In addition, a lower limit is not particularly limited, but it is preferably as low as possible, and 0 ppm is most desirable.

A method of measuring an amount of water in a calcium carbonate filler is as follows.
<Measurement Method>

An amount of water in a calcium carbonate filler at 200 to 300° C. was measured with a Karl Fischer method water analyzer (manufactured by Mitsubishi Chemical Corporation; CA-100) using a water evaporation device (manufactured by Mitsubishi Chemical Corporation; VA-100). Measurement was performed three times, and an average thereof was adopted.

A generated gas amount of M/Z 44 of the calcium carbonate filler of the present invention preferably further satisfies the following expression (d).

$$Co \leq 300 \text{ (ppm)} \tag{d}$$

wherein
Co: A generated amount of M/Z 44 (ppm) in a range of 100 to 200° C., measured using a differential thermobalance and mass spectrometry simultaneous measuring device (TG-DTA-MS manufactured by Rigaku Co., Ltd., trade name Thermo Mass photo).

M/Z 44 indicates a generated gas amount of mainly carbon dioxide (molecular weight 44). A gas generated from the calcium carbonate filler is mainly carbon dioxide, except for water (water steam), and is preferably 300 ppm or less. The smaller the value, the easier the foamability of a resin is suppressed upon kneading. Therefore, the generated gas amount is preferably 200 ppm or less, further preferably 150 ppm or less, particularly preferably 100 ppm or less. In addition, regarding a lower limit, it is preferably as low as possible, and 0 ppm is most desirable.

A method of quantitating M/Z 44 generated from a calcium carbonate filler is as follows.

<Measurement Method>

Using about 100 mg of a calcium carbonate filler, M/Z 44 at 100 to 200° C. was measured employing a differential thermobalance and mass spectrometry simultaneous measuring device (TG-DTA-MS manufactured by Rigaku Co., Ltd., trade name Thermo Mass photo). In addition, calcium oxalate monohydrate was used as a standard sample.

When the calcium carbonate filler of the present invention is applied to a micropore forming material for a light reflecting film etc. of a liquid crystal television etc., it is preferable that, further, the content rate (%) of particles having a particle diameter of 5 μm or more satisfies the following expression (e), in a number particle size distribution in a projected area diameter (Heywood diameter) by a flow particle image analyzer (FPIA (registered trademark)-3000 manufactured by Malvern).

$$Fp \leq 2.0 (\%) \quad (e)$$

In order to incorporate the filler in a resin having a high processing temperature at a high concentration, which is the purpose and the utility of the present invention, foamability can be sufficiently suppressed by suppressing the aforementioned specific volatile component, but when the filler is applied to a micropore forming material etc. for a light reflecting film for a liquid crystal television, if an amount of the calcium carbonate filler having a particle diameter of 5 μm or more is large, the filler is difficult to contribute to reflectivity from property of light reflectivity, and incorporation at a high concentration tends to become difficult. Therefore, the content rate of particles having a particle diameter of 5 μm or more in the calcium carbonate filler is more preferably 1.5% or less, further preferably 1.0% or less. In addition, a lower limit is not particularly limited, it is preferably as low as possible, and 0% is most desirable.

A flow particle image analyzer is a device for analyzing several thousands of particle images and obtaining a particle size distribution according to an area circle equivalent diameter. Unlike the general laser diffraction method, it is said that the device hardly undergoes influence of refractivity and correction, and precision is relatively high for measuring a coarse particle.

A measurement method with the flow particle image analyzer (FPIA (registered trademark)-3000 manufactured by Malvern) is as follows.

<Measurement Method>

The flow particle image analyzer (FPIA (registered trademark)-3000 manufactured by Malvern) is used and, as a medium, methanol is used.

Before measurement, in order to make suspending of the calcium carbonate filler of the present invention constant, as pre-treatment, 0.01 g of a calcium carbonate filler and 50 ml of a methanol solvent are added and suspended in a beaker (100 ml), the suspension is preliminarily dispersed under the constant condition of 300 μA-one minute employing a chip type ultrasonic dispersing machine (US-300T; manufactured by NIHONSEIKI KAISHA LTD.) and, thereafter, measurement is performed. In addition, since a particle size distribution is a number frequency, the content rate is number %.

Calcium carbonate used in the present invention may be any of a natural product (heavy calcium carbonate) and a synthetic product (light, colloidal calcium carbonate), a crystal form thereof may be any of a form containing calcite as a main component, a form containing aragonite as a main component etc., but a synthetic product, particularly colloidal calcium carbonate contains less fine particles or coarse particles, and is preferable in respect of uniformity of particles.

For the purpose of further enhancing uniformity of synthetic calcium carbonate particles, it is preferable that a step of separating a light liquid (fine particle side) and a heavy liquid at an appropriate ratio using a separating device such as a liquid cyclone machine etc., at a stage of a calcium carbonate water slurry, or a calcium hydroxide water slurry before synthesis of calcium carbonate, is added, or that a step of subjecting a calcium carbonate powder from which volatile components have been removed at a heating step etc. to coarse powder classification with a dry precision classifying machine is added.

A method of reducing a volatile component such as water etc. contained in a surface of a particle of the calcium carbonate filler of the present invention is not particularly limited, but examples include kilns such as a tunnel kiln, a roller hearth kiln, a pusher kiln, a shuttle kiln, an elevator kiln etc., and an incubator etc. Examples of the rotary kiln include an external heating type rotary kiln, an internal heating type rotary kiln, a batch type rotary kiln etc. Further, examples include a microwave furnace etc., in which these heating devices are combined with a microwave, and a method of heat treatment in a range of a product temperature of 200° C. to 550° C. is suitable. When a product temperature of a heating temperature is lower than 200° C., it is difficult to sufficiently remove carbon dioxide present in a particle surface, and when a product temperature exceeds 550° C., calcium carbonate is easily converted into calcium oxide. Therefore, a product temperature is more preferably 250° C. to 450° C., further preferably 300 to 400° C. And, a heating time is different depending on an amount of carbon dioxide in a particle surface and, usually, a heating time around 5 to 500 minutes is suitable.

And, among a heat treating machine, in view of the cost, workability, a variation in a thermal history etc., a rotary kiln is suitable and, among rotary kilns, an external heating type rotary kiln is preferable. There is a possibility that an internal heating type rotary kiln reduces whiteness of a powder, and since a high speed flow-type mixer such as a Henschel mixer etc. is a batch type, in view of surface treatment etc. of a later step, it is hard to use such mixer from a view point of workability etc., and it is extremely difficult to realize a product temperature of 280° C. or higher. Even when an oil medium is flown through a jacket, a sealing portion is easily damaged, and it is impossible to continuously operate such mixer for a long term. Further, such mixer is not suitable in a heating temperature range of the present invention also from a view point of sealability.

Further, when a heating time is short, reduction in a volatile component such as water etc. easily becomes insufficient, and when a heating time is long, calcium carbonate is easily calcified depending on a product temperature of heat treatment, and productivity tends to become the high cost. Therefore, a heating time is more preferably 10 to 100 minutes, further preferably 15 to 50 minutes.

In the calcium carbonate filler of the present invention, various surface treating agents can be used as necessary for the purpose of improving property of the calcium carbonate filler.

The surface treating agent is not particularly limited, but examples include a saturated fatty acid, an unsaturated fatty acid, an alicyclic carboxylic acid, a resin acid or salts thereof, an ester, an alcohol surfactant, sorbitan fatty acid esters, an amide or amine surfactant, polyoxyalkylene alkyl ethers, polyoxyethylene nonyl phenyl ether, sodium alpha olefin sulfonate, a long chain alkylamino acid, amine oxide, alkylamine, a quaternary ammonium salt, an aminocarboxylic acid, a condensed phosphoric acid surface treating agent, an organophosphorus surface treating agent, a polycarboxylic acid surface treating agent, a coupling agent surface treating agent etc., and these can be used, alone or in combination of two or more kinds as necessary, for surface treatment.

Examples of the saturated fatty acid include capric acid, lauric acid, myristic acid, palmitic acid, steric acid etc.; examples of the unsaturated fatty acid include oleic acid, linoleic acid, linolenic acid etc.; examples of the alicyclic carboxylic acid include naphthenic acid having a carboxyl group on an end of a cyclopentane ring or a cyclohexane ring etc.; and examples of the resin acid include abietic acid, pimaric acid, neoabietic acid etc.

Examples of the alcohol surfactant include a sodium alkylsulfate ester, a sodium alkyl ether sulfate etc.; examples of the sorbitan fatty acid esters include sorbitan monolaurate and polyoxyethylene sorbitan monostearate etc.; examples of the amide or amine surfactant include fatty acid alkanolamide, alkylamine oxide etc.; examples of the polyoxyalkylene alkyl ethers include polyoxyethylene alkyl ether, polyoxyethylene lauryl ether, polyoxyethylene nonyl phenyl ether etc.; and examples of the long chain alkylamino acid include laurylbetaine, stearylbetaine etc.

Examples of the amine oxide include polyoxyethylene fatty acid amide, alkylamine oxide etc.; examples of the alkylamine include stearylamine acetate etc.; and examples of the quaternary ammonium salt include stearyltrimethylammonium chloride and quaternary ammonium sulfate etc.

Examples of the aminocarboxylic acid include ethylenediaminetetraacetic acid, nitrilotriacetic acid, hydroxyethylethylenediaminetriacetic acid, diethylenetriaminepentaacetic acid, triethylenetetraminehexaacetic acid etc.

Examples of the condensed phosphoric acid surface treating agent include sodium polyphosphate, sodium pyrophosphate, sodium hexametaphosphate etc.

Examples of the organophosphorus surface treating agent include 1-hydroxyethylidene-1,1-diphosphonic acid (HEDP), nytrilotrismethylene phosphonic acid (N TMP), trimethyl phosphate (TMPA), triethyl phosphate (TEP), tributyl phosphate (TBP), triphenyl phosphate (TPP), methyl phosphate acid (AP-1) etc.

Examples of the polycarboxylic acid surface treating agent include monocarboxylic acids such as polyacrylic acid, methacrylic acid, crotonic acid etc., and dicarboxylic acids such as itaconic acid, maleic acid, fumaric acid etc., and these treating agents may be used alone, or two or more of them may be used, or they may be used as a copolymer with a functional group such as polypropylene glycol (PPG) and polyethylene glycol (PEG) without any problem.

Examples of the coupling agent surface treating agent include silane coupling agents such as vinyltrimethoxysilane, N-2-(aminoethyl)-3-aminopropyltrimethoxysilane etc. and titanate coupling agents, a representative of which is isopropyltriisostearoyl titanate, etc.

The aforementioned various acids can be also used, for example, as a salt of an alkali metal such as potassium and sodium, or an ammonium salt.

Among these surface treating agents, from a viewpoint of compatibility into a resin, and heat resistance, a polyacrylic acid-based ammonium salt, nitrilotrismethylenephosphonic acid (NTMP) and trimethyl phosphate (TMPA) can be suitably used.

Particularly, in the case of a polyester resin having an ester bond, since alkali resistance is low, the abovementioned surface treating agents are effective.

A use amount of the surface treating agents varies depending on a specific surface area of calcium carbonate, the compounding condition etc., thus it is difficult to define it unconditionally, but from the purpose and the utility of the present invention, usually, 0.01 to 5% by weight based on calcium carbonate is preferable. When the use amount is less than 0.01% by weight, the sufficient surface treating effect is difficult to be obtained and, on the other hand, even when the surface treating agent is added at an amount exceeding 5% by weight, further improvement in the effect is not recognized, and there is a tendency that the surface treating agent is bled, and when kneaded with a resin, it tends to be decomposed.

A surface treating method may be, for example, a dry treating method of directly mixing a surface treating agent into a calcium carbonate powder using a mixer such as a Super mixer and a Henschel mixer and, if necessary, heating the mixture to perform surface treatment; a wet treating method of dissolving a surface treating agent in a water solvent etc., and adding the solution to a suspension of calcium carbonate in water to perform surface treatment, followed by dehydration and drying; or a method of combining both of them.

Then, the resin composition of the present invention will be explained.

The resin used in the present invention may be, of course, various resins having a low processing temperature, but a resin having a relatively high processing temperature is suitable. Examples include general-purpose resins, a representative of which is an acrylic resin (PMMA), polyvinyl alcohol (PVA), polyvinylidene chloride (PVDC), polybutadiene (PBD), polyethylene terephthalate (PET) etc.; engineering plastics such as polyacetal (POM), polyamide (PA), polycarbonate (PC), modified polyphenylene ether (PPE), polybutylene terephthalate (PBT), ultra high molecular weight polyethylene (UHPE), polysulfone (PSF), polyether sulfone (PES), polyphenylene sulfide (PPS), polyarylate (PAR), polyether ether ketone (PEEK), polyimide (PI), polyetherimide (PEI), a fluororesin (FR), a liquid crystal polymer (LCP) etc.; and thermosetting resins such as phenol, urea, melamine, alkyd, unsaturated polyester, epoxy, diallyl phthalate, polyurethane, modified silicone, polysulfide, reactive acryl, polyisobutylene, silylated urethane, modified epoxy etc. Further, biodegradable plastics such as a polylactic acid resin, polybutylene succinate, polyamide 11, polyhydroxybutyric acid etc., and biomass plastics can be also used.

Among them, polyester resins having an ester bond such as PET, PBT, PEN, PC, LCP etc. have high versatility as sheet and film processed products and, particularly, PET is suitable in the purpose and the utility of the present invention.

A ratio of incorporating the calcium carbonate filler for a resin of the present invention to a resin is greatly different depending on a kind and utility of a resin, desired physical property and the cost, and may be appropriately determined depending on them, but from an object of incorporation at a high concentration, for example, when used as a porous film for light reflection, the ratio is usually 6 to 200 parts by weight, more preferably 10 to 150 parts by weight, further preferably 20 to 120 parts by weight based on 100 parts by weight of the resin.

And, if necessary, in order to improve physical property of a resin composition of the present invention, a lubricant such as fatty acid amide, ethylene bisstearic acid amide, sorbitan fatty acid ester etc., a plasticizer, a stabilizer, an antioxidant etc. may be added in such a range that efficacy of the resin composition of the present invention is not inhibited. Further, additives which are generally used in a resin composition for a film, for example, a lubricant, an antioxidant, a fluorescent brightening agent, a heat stabilizer, a light stabilizer, an ultraviolet absorbing agent, a neutralizing agent, an anti-fogging agent, an anti-blocking agent, an antistatic agent, a slipping agent, a colorant etc. may be incorporated.

When the calcium carbonate filler of the present invention and various additives are incorporated into a resin, they are mixed using the known mixer such as a Henschel mixer, a tumbler type mixer, a ribbon blender etc.

After a resin composition is mixed with a mixer, it is heat-kneaded with a monoaxial or biaxial extruder, a kneader, a Banbury mixer etc. A pellet containing various additives including the calcium carbonate filler of the present invention, which is called master batch, is prepared once, and the pellet is melted using the known molding machine such as T die extrusion, or inflation molding, to form a film. Thereafter, if necessary, the film is monoaxially or biaxially stretched into a porous film product having a uniform micropore diameter.

Further, if necessary, it is possible to perform a plurality of sets of steps to T die extrusion in the aforementioned steps to form a film into a multilayer structure at extrusion; or to introduce a step of bonding films together at stretching, and stretching this again to form a multilayer film; or to conduct aging of the film at the temperature condition under which a temperature is higher than a normal temperature and lower than a melting temperature of a resin.

And, for the purpose of imparting printability to the film, a film surface may be subjected to surface treatment such as plasma discharge etc. to coat an ink receiving layer thereon, or a solution of a heat-resistant resin (aromatic paraaramid, polyphenylene sulfide (PPS), polyether ether ketone (PEEK) resin etc.) in an organic solvent as a coating solution may be coated on at least one side of a film, as a protective layer, without any problem.

And, the calcium carbonate filler of the present invention may be dissolved using hydrochloric acid etc. which dissolves calcium carbonate and a surface treating agent, to obtain a porous film product having only fine pores without any problem.

EXAMPLES

The present invention will be further specifically explained below based on Examples, but the scope of the present invention is not limited by these Examples at all.

Example 1

Quicklime obtained by firing a grey compact limestone with a coma furnace type kiln using kerosene as a heat source was dissolved to obtain a slaked lime slurry, and this was reacted with carbon dioxide to synthesize calcium carbonate. A BET specific surface area at that time was 20 $m^2/g$. The calcium carbonate water slurry was subjected to particle growth by Ostwald aging to obtain a calcium carbonate water slurry having a BET specific surface area of 2.7 $m^2/g$. The resulting calcium carbonate water slurry was dehydrated and dried with a filter press machine and a flash drier.

Then, the dried slurry was heat-treated under the heating condition of 300° C. for 30 minutes using an external combustion type rotary kiln to prepare a calcium carbonate filler, and powder physical property such as a particle size distribution (content rate of particles having a particle diameter of 0.26 μm or less, laser diffraction diameter, electron microscope diameter), a BET specific surface area, a water amount etc. was confirmed. The resulting powder physical property and the implementation condition are shown in Table 1.

Example 2

A calcium carbonate filler was prepared by an operation performed under the same condition as that of Example 1 except that a step of wet-treating the calcium carbonate water slurry prepared in Example 1 with commercially available nitrilotrismethylenephosphonic acid (NTMP), as a surface treating agent, such that it is 0.5% by weight based on calcium carbonates, was added. Powder physical property of the resulting calcium carbonate filler and the implementation condition are shown in Table 1.

An observation photograph (magnification 3000) of an electron microscope SEM diameter measured regarding the resulting calcium carbonate filler is shown as FIG. 1.

Example 3

A calcium carbonate filler was prepared by an operation performed under the same condition as that of Example 1 except that a step of dry-treating the heat-treated calcium carbonate prepared in Example 1 with commercially available trimethyl phosphate (TMPA), as a surface treating agent, such that it is 0.5% by weight based on calcium carbonate, using a Super mixer under the condition of a 130° C. end point, was added. Powder physical property of the resulting calcium carbonate filler and the implementation condition are shown in Table 1.

Example 4

A calcium carbonate filler was prepared by an operation performed under the same condition as that of Example 1 except that a step of dry-treating the heat-treated calcium carbonate prepared in Example 1 with commercially available ammonium polyacrylate, as a surface treating agent, such that it is 0.5% by weight based on calcium carbonate, using a Super mixer under the condition of a 130° C. end point, was added. Powder physical property of the resulting calcium carbonate filler and the implementation condition are shown in Table 1.

Example 5

A calcium carbonate filler was prepared by an operation performed under the same condition as that of Example 2 except that a BET specific surface area of calcium carbonate which had been subjected to particle growth by Ostwald aging was changed to 1.8 $m^2/g$. Powder physical property of the resulting calcium carbonate filler and the implementation condition are shown in Table 1.

Example 6

A calcium carbonate filler was prepared by an operation performed under the same condition as that of Example 2 except that a BET specific surface area of calcium carbonate which had been subjected to particle growth by Ostwald aging was changed to 4.5 $m^2/g$. Powder physical property of the resulting calcium carbonate filler and the implementation condition are shown in Table 1.

Example 7

A calcium carbonate filler was prepared by an operation performed under the same condition as that of Example 2 except that a BET specific surface area of calcium carbonate which had been subjected to particle growth by Ostwald aging was changed to 6.2 m²/g. Powder physical property of the resulting calcium carbonate filler and the implementation condition are shown in Table 1.

Example 8

A calcium carbonate filler was prepared by an operation performed under the same condition as that of Example 2 except that a BET specific surface area of calcium carbonate which had been subjected to particle growth by Ostwald aging was changed to 7.8 m²/g. Powder physical property of the resulting calcium carbonate filler and the implementation condition are shown in Table 1.

Example 9

A calcium carbonate filler was prepared by an operation performed under the same condition as that of Example 2 except that the heating condition of an external combustion type rotary kiln was changed to 220° C. and 100 minutes. Powder physical property of the resulting calcium carbonate filler and the implementation condition are shown in Table 1.

Example 10

A calcium carbonate filler was prepared by an operation performed under the same condition as that of Example 2 except that a box-shaped microwave furnace was used, and the heating condition was changed to 270° C. and 100 minutes. Powder physical property of the resulting calcium carbonate filler and the implementation condition are shown in Table 1.

Example 11

A calcium carbonate filler was prepared by an operation performed under the same condition as that of Example 2 except that the heating condition of an external combustion type rotary kiln was changed to 450° C. and 15 minutes. Powder physical property of the resulting calcium carbonate filler and the implementation condition are shown in Table 1.

Example 12

A calcium carbonate filler was prepared by an operation performed under the same condition as that of Example 2 except that the heating condition of an external combustion type rotary kiln was changed to 530° C. and 15 minutes. Powder physical property of the resulting calcium carbonate filler and the implementation condition are shown in Table 1.

Example 13

A calcium carbonate filler was prepared by an operation performed under the same condition as that of Example 3 except that the condition was changed to commercially available trimethyl phosphate (TMPA), as a surface treating agent, such that it is 5.0% by weight based on calcium carbonate, using a Super mixer under the condition of a 130° C. end point. Powder physical property of the resulting calcium carbonate filler and the implementation condition are shown in Table 1.

Example 14

A calcium carbonate filler was prepared by an operation performed under the same condition as that of Example 3 except that the condition was changed to commercially available trimethyl phosphate (TMPA), as a surface treating agent, at 0.1% by weight based on calcium carbonate, using a Super mixer under the condition of a 130° C. end point. Powder physical property of the resulting calcium carbonate filler and the implementation condition are shown in Table 1.

Example 15

A calcium carbonate filler was prepared by an operation performed under the same condition as that of Example 2 except that the heat treating apparatus was changed to a box-shaped incubator (heating condition: 300° C., 30 minutes). Powder physical property of the resulting calcium carbonate filler and the implementation condition are shown in Table 1.

Example 16

A calcium carbonate filler was prepared by an operation performed under the same condition as that of Example 15 except that the heating condition was changed to 300° C. and 150 minutes. Powder physical property of the resulting calcium carbonate filler and the implementation condition are shown in Table 1.

Example 17

A step of separating a calcium carbonate water slurry prepared in Example 2 into a light liquid (fine particle side) and a heavy liquid at a ratio of 2:8, and removing a light liquid side, using a liquid cyclone apparatus was added, and a step of performing heat treatment with an external combustion type rotary kiln (heating condition: 300° C., 30 minutes) under the same condition as that of Example 2 and, further, subjecting the resulting dry powder to coarse powder classification with a precision classifying apparatus was added, to prepare a calcium carbonate filler. Powder physical property of the resulting calcium carbonate filler and the implementation condition are shown in Table 1.

TABLE 1

| Items | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Content rate of particles (26 μm or less) | (%) | 0 | 0 | 0 | 0 | 0 | 10 | 17 | 23 | 0 |

TABLE 1-continued

| | | | | | | | | | | |
|---|---|---|---|---|---|---|---|---|---|---|
| (a) Dms5/Dmv5 | — | 2.3 | 2.3 | 2.3 | 2.3 | 2.1 | 1.6 | 1.4 | 1.5 | 2.3 |
| (b) Sw | (m²/g) | 3.0 | 3.0 | 3.0 | 3.0 | 1.8 | 4.5 | 6.2 | 7.8 | 3.0 |
| (c) Mo | (ppm) | 150 | 40 | 60 | 110 | 30 | 50 | 80 | 120 | 230 |
| (d) Co | (ppm) | 60 | 60 | 90 | 120 | 60 | 70 | 90 | 100 | 220 |
| (e) Fp | (%) | 0.0 | 0.0 | 0.0 | 0.0 | 1.3 | 0.0 | 0.0 | 0.0 | 0.0 |
| Surface treating agent | — | — | NTMP | TMPA | APA | NTMP | NTMP | NTMP | NTMP | NTMP |
| Amount treated | (wt. %) | — | 0.5 | 0.5 | 0.5 | 0.5 | 0.5 | 0.5 | 0.5 | 0.5 |
| Calcium carbonate | | Synthesis | Synthesis | Synthesis | Synthesis | Synthesis | Synthesis | Synthesis | Synthesis | Synthesis |
| Heating apparatus | | External combustion type rotary kiln | External combustion type rotary kiln | External combustion type rotary kiln | External combustion type rotary kiln | External combustion type rotary kiln | External combustion type rotary kiln | External combustion type rotary kiln | External combustion type rotary kiln | External combustion type rotary kiln |
| Heating temperature | (° C.) | 300 | 300 | 300 | 300 | 300 | 300 | 300 | 300 | 220 |
| Heating time | (min) | 30 | 30 | 30 | 30 | 30 | 30 | 30 | 30 | 100 |
| Dms5 | (μm) | 0.89 | 0.89 | 0.89 | 0.89 | 1.12 | 0.38 | 0.30 | 0.30 | 0.89 |
| Dmv5 | (μm) | 0.39 | 0.39 | 0.39 | 0.39 | 0.54 | 0.24 | 0.22 | 0.20 | 0.39 |

| Items | | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Content rate of particles (26 μm or less) | (%) | 0 | 0 | 0 | 0 | 0 | 0 | 0 | 0 |
| (a) Dms5/Dmv5 | — | 2.3 | 2.7 | 2.9 | 2.3 | 2.3 | 2.3 | 2.3 | 1.9 |
| (b) Sw | (m²/g) | 3.0 | 2.5 | 2.3 | 3.0 | 3.0 | 3.0 | 3.0 | 2.5 |
| (c) Mo | (ppm) | 120 | 20 | 20 | 60 | 100 | 250 | 160 | 30 |
| (d) Co | (ppm) | 90 | 50 | 50 | 60 | 180 | 60 | 60 | 60 |
| (e) Fp | (%) | 0.0 | 0.6 | 1.8 | 0.0 | 0.0 | 0.0 | 0.0 | 0.0 |
| Surface treating agent | — | NTMP | NTMP | NTMP | TMPA | TMPA | NTMP | NTMP | NTMP |
| Amount treated | (wt. %) | 0.5 | 0.5 | 0.5 | 5.0 | 0.1 | 0.5 | 0.5 | 0.5 |
| Calcium carbonate | | Synthesis | Synthesis | Synthesis | Synthesis | Synthesis | Synthesis | Synthesis | Synthesis |
| Heating apparatus | | Microwave furnace | External combustion type rotary kiln | External combustion type rotary kiln | External combustion type rotary kiln | External combustion type rotary kiln | Box-shaped incubator | Box-shaped incubator | External combustion type rotary kiln |
| Heating temperature | (° C.) | 270 | 450 | 530 | 300 | 300 | 300 | 300 | 300 |
| Heating time | (min) | 100 | 15 | 15 | 30 | 30 | 30 | 150 | 30 |
| Dms5 | (μm) | 0.89 | 1.10 | 1.22 | 0.89 | 0.89 | 0.89 | 0.89 | 0.91 |
| Dmv5 | (μm) | 0.39 | 0.41 | 0.42 | 0.39 | 0.39 | 0.39 | 0.39 | 0.48 |

NTMP: Nitrilotrismethylenephosphonic acid
TMPA: Trimethyl phosphate
APA: Ammonium polyacrylate

Comparative Example 1

A calcium carbonate filler was prepared by an operation performed under the same condition as that of Example 2 except that a heat treating step was not performed. Powder physical property of the resulting calcium carbonate filler and the implementation condition are shown in Table 2.

Figure 2:
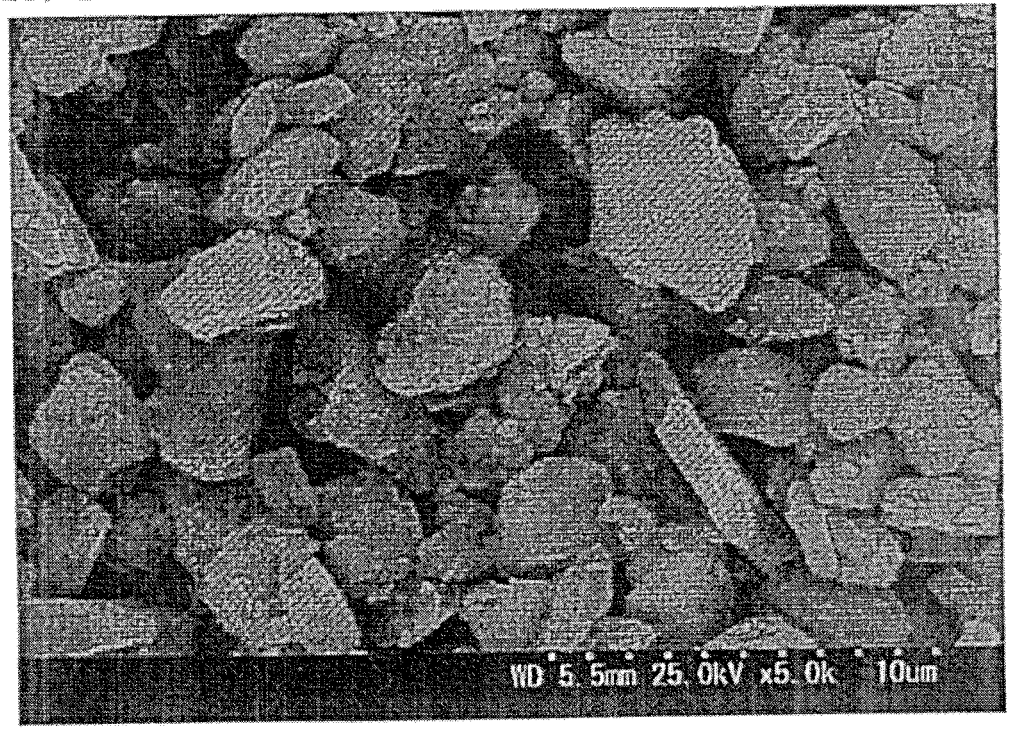
FIG. 2 shows a photograph of an electron microscope SEM diameter of a calcium carbonate filler for a resin obtained in Comparative Example 1.

A photograph (magnification 10000) of observation of an electron microscope SEM diameter measured in Comparative Example 1 is shown as FIG. 2. It is recognized that there are more fine powders as compared with the present Example 2.

Comparative Example 2

Commercially available heavy calcium carbonate (#2000, manufactured by Maruo Calcium Co., Ltd.) was classified with a precision fluid classifying apparatus to recover a coarse powder side. Then, the coarse powder side was heat-treated with an external combustion type rotary kiln (heating condition: 300° C., 30 minutes) to prepare a calcium carbonate filler. Powder physical property of the resulting calcium carbonate filler and the implementation condition are shown in Table 2.

Comparative Example 3

A calcium carbonate filler was prepared by an operation performed under the same condition as that of Example 2 except that a BET specific surface area of calcium carbonate which had been subjected to particle growth by Ostwald aging was changed to 11.4 m²/g. Powder physical property of the resulting calcium carbonate filler and the implementation condition are shown in Table 2.

Comparative Example 4

A calcium carbonate filler was prepared by an operation performed under the same condition as that of Example 2 except that a BET specific surface area of calcium carbonate which had been subjected to particle growth by Ostwald aging was changed to 0.7 m²/g. Powder physical property of the resulting calcium carbonate filler and the implementation condition are shown in Table 2.

Comparative Example 5

A step of wet-treating the calcium carbonate water slurry prepared in Example 1 with commercially available sodium hexametaphosphate and commercially available potassium stearate, as a surface treating agent, such that they are 0.3% by weight and 1.0% by weight, respectively, was added. Thereafter, the surface-treated calcium carbonate water slurry was dehydrated and dried with a filter press machine and a flash drier and, further, the resulting dry powder was subjected to coarse powder classification with a precision fluid classifying apparatus, without performing heat-treatment, thereby, a calcium carbonate filler was prepared. Powder physical property of the resulting calcium carbonate filler and the implementation condition are shown in Table 2.

tivity and light resistance as physical property of a light reflecting sheet was performed. The resulting assessment results are shown in Table 3 and Table 4.

Specific assessment and measurement method is as follows.

"Assessment and Measurement Method"

1) Moldability

Upon extrusion molding, whether stable extrusion is possible or not was observed, and moldability was assessed based on the following criteria.

TABLE 2

| Items | | Comp. Ex. 1 | Comp. Ex. 2 | Comp. Ex. 3 | Comp. Ex. 4 | Comp. Ex. 5 |
|---|---|---|---|---|---|---|
| Content rate of particles (26 μm or less) | (%) | 0 | 37 | 42 | 0 | 0 |
| (a) Dms5/Dmv5 | — | — | 2.3 | 4.9 | 1.2 | 3.4 | 2.3 |
| (b) Sw | (m²/g) | 3.0 | 3.1 | 11.4 | 0.7 | 3.0 |
| (c) Mo | (ppm) | 320 | 30 | 160 | 20 | 430 |
| (d) Co | (ppm) | 330 | 70 | 120 | 50 | 330 |
| (e) Fp | (%) | 0.0 | 2.1 | 0.0 | 2.3 | 0 |
| Surface treating agent | — | NTMP | NTMP | NTMP | Sodium hexametaphosphate Potassium stearate |
| Amount treated | (wt. %) | 0.5 | 0.5 | 1.0 | 0.5 | 0.3 1.0 |
| Calcium carbonate | | Synthesis | Natural | Synthesis | Synthesis | Synthesis |
| Heating apparatus | | — | External combustion type rotary kiln | External combustion type rotary kiln | External combustion type rotary kiln | — |
| Heating temperature | (° C.) | — | 300 | 300 | 300 | — |
| Heating time | (min) | — | 30 | 30 | 30 | — |
| Dms5 | (μm) | 0.89 | 0.69 | 0.22 | 1.56 | 0.89 |
| Dmv5 | (μm) | 0.39 | 0.14 | 0.18 | 0.46 | 0.39 |

NTMP: Nitrilotrismethylenephosphonic acid

Examples 18 to 34, Comparative Examples 6 to 10

<White PET Resin Film>

As a raw material, 100 parts by weight of a PET resin having an intrinsic viscosity of 0.62, 30 parts by weight of each of the calcium carbonate fillers prepared in Examples 1 to 17 and Comparative Examples 1 to 5, and 1 part by weight of a benzotriazole-type light stabilizer were charged into a Henschel mixer, and mixed for 5 minutes to obtain a composition of a calcium carbonate filler and a resin.

The resulting composition was melt-kneaded with a biaxial kneading machine 2D25W manufactured by Toyo Seiki Seisaku-Sho, Ltd., and this was extruded and molded at an aperture of 38 μm to obtain a pellet.

Then, a T die was mounted in a biaxial kneading machine 2D25W manufactured by Toyo Seiki Seisaku-Sho, Ltd., and the resulting pellet was subjected to melt kneading and film forming to obtain an unstretched sheet. The resulting unstretched sheet was stretched at about 3-fold in a longitudinal direction, then, the film stretched in a longitudinal direction was stretched at about 3.5-fold under a temperature of 140° C. in a tenter oven while both ends of the film were held with clips, to prepare a porous stretched sheet having a thickness of 180 μm.

On the thus obtained porous stretched sheet was coated a polyester hot melt-type adhesive with a gravure coater at a thickness of 7 μm. On the porous stretched sheet coated with this adhesive was laminated an aluminum sheet having a thickness of 200 μm which is a plate-like support at a temperature of 75° C. to obtain a light reflecting sheet.

Extrusion moldability during pellet making, and stretchability during film forming were assessed, and a test of reflec- ⊚: Viscosity at extrusion molding is low, torque is also stable, and discharge amount is also constant.

○: Viscosity at extrusion molding is slightly high, but torque and discharge amount are stable.

Δ: Viscosity at extrusion molding is high, torque and discharge amount are unstable, but pellet can be obtained.

x: Viscosity at extrusion molding is high, torque is unstable, and upon discharge, foaming occurs, and pellet is not obtained.

2) Stretchability

Film forming property and foamability upon stretching-film forming were assessed based on the following criteria.

○: Foaming and streaks are not found.

Δ: Some foaming and streaks are found, but they are not at a problematic level.

x: Foaming and streaks are many, and thus unusable.

3) Reflectivity

Using an ultraviolet visible spectrophotometer (UV3101PC: manufactured by Shimadzu Corporation), reflectivity at a wavelength range of 400 to 700 nm was measured when reflectivity of a barium sulfate white plate is 100%, and reflectivity at 550 nm was adopted as a representative value. It can be said that the higher the total reflectivity, the more uniform void diameter is obtained in the aforementioned wavelength range.

4) Light Resistance Test

In a light resistance test, reflectivity after irradiation with light for 120 hours was measured using a solar simulator (YSS-50A; manufactured by Yamashita Denso Corporation). It can be said that the higher the reflectivity after light irradiation, the higher the light resistance as a light reflecting film.

TABLE 3

| Items | Examples |  |  |  |  |  |  |  |  |  |  |  |  |  |  |  |  |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Example number of calcium carbonate used | 1 | 2 | 3 | 4 | 5 | 6 | 7 | 8 | 9 | 10 | 11 | 12 | 13 | 14 | 15 | 16 | 17 |
| 1) Moldability | Δ | ⊚ | ⊚ | ○ | ⊚ | ⊚ | ⊚ | ○ | ○ | ⊚ | ○ | Δ | ○ | ○ | ○ | ⊚ | ⊚ |
| 2) Strechability | Δ | ⊚ | ⊚ | ○ | ○ | ⊚ | ○ | ○ | Δ | ○ | ○ | Δ | ⊚ | Δ | ○ | ○ | ⊚ |
| 3) Reflectivity | 92 | 97 | 96 | 96 | 92 | 95 | 94 | 93 | 96 | 96 | 94 | 92 | 96 | 96 | 96 | 96 | 98 |
| 4) Light resistance | 89 | 96 | 94 | 94 | 91 | 94 | 93 | 92 | 93 | 94 | 91 | 87 | 91 | 94 | 94 | 94 | 96 |

TABLE 4

| Items | Comp. Examples |  |  |  |  |
|---|---|---|---|---|---|
| | 6 | 7 | 8 | 9 | 10 |
| Comp. Example number of calcium carbonate used | 1 | 2 | 3 | 4 | 5 |
| 1) Moldability | X | Δ | Δ | ⊚ | Δ |
| 2) Strechability | X | X | X | ○ | X |
| 3) Reflectivity | Unmeasurable | 89 | 82 | 83 | Unmeasurable |
| 4) Light resistance | Unmeasurable | 87 | 80 | 82 | Unmeasurable |

From the above results, it was recognized that the calcium carbonate filler of the present invention is excellent in moldability and stretchability, as well as reflectivity and light resistance when formulated into a resin composition in which the filler was incorporated into a PET resin.

Examples 35 to 49, Comparative Examples 11 to 15

<PPS Resin Lamp Reflector>

After 40 parts by weight of a PPS resin (melt viscosity: 190 Pa·s; manufactured by Toso Sastil), 10 parts by weight of talc (trade name: PK-S; manufactured by Hayashi-Kasei Co., Ltd.), 5 parts by weight of wallastonite, and 45 parts by weight of each of the calcium carbonate fillers of Examples 1 to 12 and 15 to 17, and Comparative Examples 1 to 5 were dry-blended, the blend was melt-kneaded with a screw extruder set at the extrusion condition of 320° C., and melt-kneaded with an extrusion molding apparatus to obtain a pellet. The resulting pellet was dried, and injection-molded under the condition of a cylinder temperature of 320° C. and a mold temperature of 130° C. using an injection molding apparatus, thereby, a test piece of ASTM No. 1 dumbbell piece (width 10 mm×thickness 1.0 mm) was obtained.

Regarding the resulting test piece, the following assessment was performed. Assessment results are shown in Tables 5 and 6.

1) Strength
Tensile strength: ASTM D638
Bending strength: ASTM D790
Impact strength: ASTM D256
2) Adhering Force of Metal Film
In a plate-like molded product deposited with aluminum, an aluminum-deposited film of 10 mm square was cut at an interval of 1 mm using a cutter knife, and the aluminum-deposited film was divided into 100 grid-like sections. On this surface was applied a cellophane tape, the section number of the aluminum-deposited film which remained on the plate-like molded product after the cellophane tape is peeled was counted, and 3 stage assessment was performed based on the following criteria.

It can be said that the more the aluminum-deposited film is difficult to be peeled, more excellent an adhering force of the aluminum-deposited film onto the plate-like molded product.
○: The section number of a remaining aluminum-deposited film is more than 90.
Δ: The section number of a remaining aluminum-deposited film is 50 to 90.
x: The section number of a remaining aluminum-deposited film is less than 50.
3) Glossiness of Metal Film
Glossiness of the aluminum-deposited film was measured by JISK7105 (1981), and assessed at 3 stage based on the following criteria. It can be said that the higher the glossiness, the less the irregularities, and the film is flat.
○: 120<glossiness
Δ: 100≤glossiness≤120
x: Glossiness<100
4) Heating Loss
Into an aluminum cup was placed 10 g of a pellet (PPS resin composition), this was preliminarily dried for 1 hour under the atmosphere at 150° C., and a weight of a pellet was measured. Then, heat treatment was performed for 1 hour under the atmosphere at 320° C. to obtain a weight reduction rate. The larger the weight reduction amount by heat treatment at 320° C., since when used in a member of a lamp reflector, a problem arises that the surrounding of the lamp is clouded with a generated gas, usually, weight reduction is suitably 1% or less.

TABLE 5

| Items | | Examples |  |  |  |  |  |  |  |  |  |  |  |  |  |  |
|---|---|---|---|---|---|---|---|---|---|---|---|---|---|---|---|---|
| | | 35 | 36 | 37 | 38 | 39 | 40 | 41 | 42 | 43 | 44 | 45 | 46 | 47 | 48 | 49 |
| Example number of calcium carbonate used | | 1 | 2 | 3 | 4 | 5 | 6 | 7 | 8 | 9 | 10 | 11 | 12 | 15 | 16 | 17 |
| 1) Tensile strength | MPa | 90 | 95 | 93 | 92 | 90 | 95 | 96 | 96 | 94 | 95 | 92 | 88 | 94 | 95 | 95 |
| 1) Bending strength | MPa | 103 | 114 | 110 | 105 | 110 | 108 | 118 | 121 | 113 | 114 | 110 | 105 | 108 | 110 | 115 |
| 1) Impact strength (with a notch) | J/m | 23.8 | 25.3 | 25.2 | 24.6 | 25.5 | 24.8 | 23.8 | 24.6 | 25.0 | 25.2 | 25.7 | 26.0 | 25.4 | 25.1 | 25.0 |
| 2) Adhering force of metal film | | Δ | ○ | Δ | ○ | Δ | ○ | ○ | ○ | ○ | ○ | Δ | Δ | Δ | ○ | ○ |

TABLE 5-continued

| Items | | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|
| 3) Glossiness of metal film | | Δ | ○ | ○ | ○ | ○ | ○ | ○ | ○ | ○ | ○ | ○ | Δ | ○ | ○ | ○ |
| 4) Heating loss | wt. % | 0.3 | 0.2 | 0.4 | 0.6 | 0.2 | 0.5 | 0.6 | 0.7 | 0.8 | 0.4 | 0.1 | 0.1 | 0.9 | 0.5 | 0.1 |

TABLE 6

| | | Comp. Examples | | | | |
|---|---|---|---|---|---|---|
| Items | | 11 | 12 | 13 | 14 | 15 |
| Comp. Example number of calcium carbonate used | | 1 | 2 | 3 | 4 | 5 |
| 1) Tensile strength | MPa | 95 | 86 | 97 | 84 | 92 |
| 1) Bending strength | MPa | 113 | 98 | 117 | 100 | 106 |
| 1) Impact strength (with a notch) | J/m | 24.8 | 24.3 | 23.6 | 26.2 | 24.6 |
| 2) Adhering force of metal film | | X | X | Δ | Δ | ○ |
| 3) Glossiness of metal film | | Δ | X | Δ | X | ○ |
| 4) Heating loss | wt. % | 1.3 | 0.6 | 1.1 | 0.2 | 1.5 |

From the above results, it was recognized that the calcium carbonate filler of the present invention is excellent in molding processability with a PPS resin, and is excellent in strength, dimensional stability, adhesion with a metal-deposited film, surface smoothness and heat resistance, and physical property for application to a PPS resin lamp reflector is sufficiently obtained.

INDUSTRIAL APPLICABILITY

As described above, since the calcium carbonate filler for a resin of the present invention contains less fine powders, has a particle size which has been adjusted to a specific particle size, and contains less volatile components such as water etc., it does not cause a problem of foaming etc. at molding even when incorporated into a resin having a high processing temperature at a high concentration. Therefore, the calcium carbonate filler for a resin of the present invention is particularly useful in the field of a light reflection plate for a liquid crystal requiring reflectivity and light resistance, and a lamp reflector requiring an adhering force with a metal film and glossiness, and the like.

The invention claimed is:

1. A calcium carbonate filler for a resin, in which a content rate of particles having a particle diameter of 0.26 μm or less is 30% or less in a number particle size distribution diameter measured (Mac-VIEW manufactured by Mountech) from an electron micrograph, and which satisfies the following expressions (a) to (c):

$$Dms5/Dmv5 \leq 3; \quad (a)$$

$$1 \leq Sw \leq 8 \ (m^2/g); \text{ and} \quad (b)$$

$$Mo \leq 300 \ (ppm), \quad (c)$$

wherein:
Dmv5: A 5% diameter (μm) of a particle body which is a secondary aggregated body or a tertiary aggregated body formed by aggregation of primary particles in a volume particle size distribution by a laser diffraction particle size distribution measuring device (MASTERSIZER2000 manufactured by Malvern),
Dms5: A 5% diameter (μm) of a particle body which is a secondary aggregated body or a tertiary aggregated body formed by aggregation of primary particles in a number particle size distribution diameter (Mac-VIEW manufactured by Mountech) measured with an electron microscope,
Sw: A BET specific surface area (Macsorb manufactured by Mountech) (m²/g), and
Mo: A water amount (ppm) by the Karl Fischer method at 200 to 300° C.

2. The calcium carbonate filler for a resin according to claim 1, wherein a generated gas amount of M/Z44 satisfies the following expression (d):

$$Co \leq 300 \ (ppm), \quad (d)$$

wherein Co: A generated amount (ppm) of M/Z44 in a range of 100 to 200° C., according to a differential thermobalance and mass spectrometry simultaneous measuring device (TG-DTA-MS manufactured by Rigaku Co., Ltd., trade name Thermo Mass photo).

3. The calcium carbonate filler for a resin according to claim 1, wherein the content rate FP (%) of particles having a particle diameter of 5 μm or more satisfies the following expression (e), in a number particle size distribution in a projected area diameter by a flow particle image analyzer (FPIA (registered trademark)-3000 manufactured by Malvern):

$$Fp \leq 2(\%). \quad (e)$$

4. The calcium carbonate filler for a resin according to claim 1, wherein the calcium carbonate filler has been surface-treated with at least one selected from the group consisting of a polycarboxylic acid surface treating agent and an organophosphorus surface treating agent.

5. A process for producing the calcium carbonate filler for a resin as defined in claim 1, which comprises heat-treating calcium carbonate at a product temperature of 200 to 550° C. using an heating device selected from the group consisting of a kiln, an incubator and a microwave furnace.

6. A resin composition comprising a resin and the calcium carbonate for a resin as defined in claim 1.

7. The resin composition according to claim 6, wherein the resin is a polyester resin.

8. The resin composition according to claim 7, wherein the polyester resin is polyethylene terephthalate (PET) for light reflection.

9. The resin composition according to claim 6, wherein the resin is a polyphenylene sulfide resin.

* * * * *